3,109,771
CONTROL OF NEMATODES WITH THE AID OF ALKALI AND ALKALINE EARTH METAL FORMATES
Louis C. Struijs, Zeist, Netherlands, assignor to N.V. Exploitatiemaatschappij "Elkabe," De Bilt, Netherlands, a corporation of the Netherlands
No Drawing. Filed July 10, 1961, Ser. No. 122,634
Claims priority, application Germany July 13, 1960
7 Claims. (Cl. 167—22)

It is known that the control of plant parasites is of great importance for agriculture, horticulture and silviculture. From investigations that have been made of late years it has appeared more and more clearly that the group of the nematodes plays a very important part among the plant parasites. In the control of these nematodes by means of the conventional control agents difficulties are experienced, however, inter alia owing to the phytotoxic action which is often rather protracted, and to the difficult application technique, while, moreover, the products used for this purpose are often very expensive.

I have now found that alkali and/or alkaline earth metal formates have a strong nematocidal action and more particularly are suitable for controlling nematodes freely living in the soil. Accordingly the invention relates to the application of said formates for controlling freely living nematodes as well as to the nematocidal preparations used for said purpose, said preparations being characterized by a content of one or more of said formates. The term alkali metal formates should be understood to comprise ammonium formate and the term alkaline earth metal formates to comprise magnesium formate.

The invention is especially of importance in connection with the use of calcium formate and it will therefore in the first place be elucidated with reference to calcium formate.

I have found that calcium formate is not only an active nematocide, but that in addition it offers the great advantage that it has no essential phytotoxic after-action, though formates per se may be toxic for the plants. In all probability this is due to the rapid oxidation of the formic acid radical in the soil; after the formate has fulfilled its task in killing the nematodes it is rapidly decomposed into the harmless carbon dioxide and water. Accordingly, it is possible already after a short time to sow or to plant in a noncultivated soil or substratum even after the application thereto of relatively large amounts of calcium formate. The calcium formate can also be applied to a soil or substratum which is already under cultivation if circumstances are favorable, for example, if the plants are in a state of rest. The nematocidal effect of the formates in the soil is promoted by the fact that owing to the rapid oxidation of the formates the oxygen present in the soil or in the culture medium is consumed, which renders the living conditions for the nematodes still more unfavorable.

Calcium formate can only be used for controlling freely living nematodes; it is substantially without effect against nematodes enclosed in cysts.

The calcium formate can be incorporated into the soil either as such, mixed with solid carriers or in the form of solutions e.g. by scattering, atomizing or spraying. As solid carriers both inert materials such as sand, clay and the like and fertilizers such as e.g. ground crude phosphate, secondary calcium phosphate, blast furnace slag, Thomas meal, calcium carbonate or magnesium carbonate may be used, as well as materials which improve the structure of the soil, other agents for controlling plant diseases or killing weeds and organic materials or other fertilizing agents, such as compost peat and the like. The content of calcium formate in the mixture should be so high that in the proportions suitable for actual practice the actual preparations have the required nematocidal effect.

Though the control of nematodes in the soil is the main object of the invention calcium formate may also be used for killing nematodes present on agricultural products such as e.g. seeds, onions, tubers and seedlings, as well as in products utilized in agriculture as e.g. the sludge obtained in the industries which work up potatoes and sugar beets, compost, earth for potted plants, peaty earth and the like and these uses are also covered by the invention. In these cases the nematodes may be controlled without any damage being done to the plants, if the treatment is carried out when the plants are in a state of rest, or if preparations of so low a concentration are used that a phytotoxic effect will not manifest itself.

Calcium formate may also be used in the form of preparations which are obtained by entirely or partly neutralizing formic acid with acid binding calcium compounds such as e.g. calcium carbonate or calcium phosphate. It is possible, for example to decompose crude phosphate with formic acid, so as to produce a mixture consisting of monocalcium phosphate and calcium formate, in a similar manner as in the manufacture of superphosphate. Also blast furnace slag may be decomposed in this manner.

The calcium formate is the preferred representative of the claimed group of nematocidal compounds, because it has a very good activity, is easily applicable and also cheap and the calcium remaining in the soil after the decomposition of the calcium formate is entirely harmless.

It is also possible, however, to use alkali metal formates or other alkaline earth metal formates because they have a similar effect, in the first place magnesium formate which is similar to calcium formate. Of the alkali metal formates potassium and ammonium formate are particularly suitable. Sodium formate when used would cause an undesirable increase of the sodium content of the soil under certain conditions.

I claim:

1. A method of controlling free-living nematodes, which comprises contacting said nematodes with a member selected from the group consisting of calcium formate, magnesium formate, potassium formate, and ammonium formate in an amount sufficient to kill said nematodes.

2. A method of controlling free-living nematodes in soil which comprises incorporating a member selected from the group consisting of calcium formate, magnesium formate, potassium formate and ammonium formate into said soil in an amount sufficient to kill said nematodes.

3. A method of controlling free-living nematodes in soil which comprises incorporating a mixture of formate and fertilizer into said soil, said formate selected from the group consisting of calcium formate, magnesium formate, potassium formate and ammonium formate, said fertilizer selected from the group consisting of secondary calcium phosphate, blast furnace slag, calcium carbonate and magnesium carbonate, in an amount sufficient to kill said nematodes.

4. A method of controlling free-living nematodes in soil which comprises incorporating calcium formate into said soil in an amount sufficient to kill said nematodes.

5. A method of controlling free-living nematodes in soil which comprises incorporating magnesium formate into said soil in an amount sufficient to kill said nematodes.

6. A method of controlling free-living nematodes in soil which comprises incorporating potassium formate into said soil in an amount sufficient to kill said nematodes.

7. A method of controlling free-living nematodes in soil which comprises incorporating ammonium formate into said soil in an amount sufficient to kill said nematodes.

References Cited in the file of this patent
UNITED STATES PATENTS 2,217,905    Hoffman et al. _____ Oct. 15, 1940

OTHER REFERENCES

Chemical Abstracts (1), vol. 16, entry 781[1], 1922 (citing Groenewege, Mededeel. Algemeen Proefstation voor den Landbouw, No. 7, 1921).

Chemical Abstracts (2), vol. 49, entry 16291f, 1955 (citing Sinha et al., Science and Culture (India), 20, 597–599, 1955).